(12) United States Patent
Falgareiro et al.

(10) Patent No.: US 10,337,413 B2
(45) Date of Patent: Jul. 2, 2019

(54) FLOW LIMITER

(71) Applicant: Safran Helicopter Engines, Bordes (FR)

(72) Inventors: Damien Falgareiro, Moissy-Cramayel (FR); Elisa Bariteau, Moissy-Cramayel (FR); Elise Thory, Moissy-Cramayel (FR); Pascal Rizzo, Moissy-Cramayel (FR); Alexis Longin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 94 days.

(21) Appl. No.: 15/563,908

(22) PCT Filed: Mar. 31, 2016

(86) PCT No.: PCT/FR2016/050717
§ 371 (c)(1),
(2) Date: Oct. 2, 2017

(87) PCT Pub. No.: WO2016/156740
PCT Pub. Date: Oct. 6, 2016

(65) Prior Publication Data
US 2018/0119620 A1    May 3, 2018

(30) Foreign Application Priority Data
Apr. 3, 2015  (FR) ...................................... 15 52882

(51) Int. Cl.
*F16L 55/027*     (2006.01)
*F02C 9/32*       (2006.01)
(Continued)

(52) U.S. Cl.
CPC .................. *F02C 9/32* (2013.01); *F02C 7/22* (2013.01); *F02C 7/222* (2013.01); *F15D 1/025* (2013.01);
(Continued)

(58) Field of Classification Search
CPC ... F15D 1/025; F16L 55/02772; F16L 55/027; F05D 2250/25
(Continued)

(56) References Cited

U.S. PATENT DOCUMENTS 3,323,550 A    6/1967  Lee, II
3,459,407 A *  8/1969  Hollis .................. B01F 5/0603
                                                138/38

(Continued)

FOREIGN PATENT DOCUMENTS

AT              207642 B     2/1960

OTHER PUBLICATIONS

Preliminary Research Report received for French Application No. 1552882, dated Feb. 3, 2016, 3 pages (1 page of French Translation Cover Sheet and 2 pages of original document).
(Continued)

*Primary Examiner* — Patrick F Brinson
(74) *Attorney, Agent, or Firm* — Womble Bond Dickinson (US) LLP

(57) ABSTRACT

The invention relates to a flow limiter which comprises a body (1) comprising a fluid intake (2) and a fluid outlet (3), in which body a pipe (5) for circulating the fluid is provided, comprising a series of chambers having different cross-sections, connected to the fluid intake as well as to the fluid outlet, the pipe being generally tubular, and the pipe having a bottom which has a regular curve so that the pipe does not have one or more areas that retain the fluid circulating in the pipe.

8 Claims, 5 Drawing Sheets

(51) Int. Cl.
 *F02C 7/22* (2006.01)
 *F15D 1/02* (2006.01)
(52) U.S. Cl.
 CPC .... *F16L 55/02772* (2013.01); *F05D 2250/25* (2013.01)
(58) Field of Classification Search
 USPC ................ 138/39–42; 366/336, 339, 338
 See application file for complete search history.

(56) References Cited

U.S. PATENT DOCUMENTS

| | | | |
|---|---|---|---|
| 3,983,903 A | | 10/1976 | Kuehn, Jr. |
| 4,053,141 A | * | 10/1977 | Gussefeld ............. B01F 5/0656 366/339 |
| 4,534,659 A | * | 8/1985 | Dourdeville ............ B01F 3/088 366/338 |
| 5,505,229 A | * | 4/1996 | Lee, II ..................... F15D 1/00 138/40 |
| 7,080,937 B1 | * | 7/2006 | Salmela ................ B01F 5/0604 366/341 |
| 9,597,732 B2 | * | 3/2017 | Lewis ............... F16L 55/02736 |
| 2010/0089689 A1 | * | 4/2010 | Cho .................... F16L 55/0336 181/230 |
| 2010/0163651 A1 | | 7/2010 | Feith et al. |

OTHER PUBLICATIONS

International search report and written opinion issued for PCT Application No. PCT/FR2016/050717, dated Jul. 20, 2016, 18 pages (8 pages of English Translation and 10 pages of Original document).

International Preliminary Report on Patentability issued for PCT Application No. PCT/FR2016/050717, dated Oct. 12, 2017, 15 pages (8 pages of English Translation and 7 pages of original document).

* cited by examiner

FLOW LIMITER

GENERAL TECHNICAL FIELD AND PRIOR ART

The invention relates to fluid flow limiting devices, and in particular those installed in an engine of a turbomachine of an aircraft.

Flow limiting devices are conventionally used to limit and thereby control a fluid collected from a main circuit.

Known from document U.S. Pat. No. 3,323,550 is a flow limiter consisting of a succession of sprinklers obtained via oriented slotted plates. These plates are superimposed and interconnected.

One problem with these solutions is that they require several parts which must be assembled in situ, often manually.

In addition, these solutions include retention zones which can cause coking problems in these zones.

PRESENTATION OF THE INVENTION

The invention proposes to mitigate at least one of these disadvantages.

To this end, the invention proposes a flow limiter comprising a body comprising a fluid intake and a fluid outlet; body in which is arranged a fluid circulation pipe comprising a succession of chambers of different cross-sections connected with the fluid intake on the one hand and with the fluid outlet on the other hand, the pipe having a generally tubular shape, the pipe having a bottom having a regular curve so that the pipe does not have any area(s) retaining the fluid circulating in the pipe.

The invention is advantageously completed by the following features, taken alone or in any technically possible combination.

The limiter is obtained by an additive manufacturing process.

The additive manufacturing process is of the laser powder-melting type.

The powder is preferably metallic, typically Hastelloy X, based on nickel or aluminum, type AS7G06.

The pipe has the shape of a helix.

The pipe is a succession of assemblies each comprising: a main cylindrical chamber having a first cross-section followed by a first secondary chamber and a cylindrical sprinkler having a second cross-section followed by a second secondary chamber.

The main chamber, the sprinkler, the first and second secondary chambers sharing a common generatrix so that the bottom of the pipe is a regular helical curve.

The first secondary chamber has a frustoconical shape and is convergent in the fluid circulation direction; the second secondary chamber has a frustoconical shape and is divergent in the fluid circulation direction.

The limiter comprises a strainer connected with the fluid intake arranged downstream of the fluid intake in the fluid circulation direction.

The limiter comprises a strainer connected with the fluid outlet arranged upstream of the fluid outlet in the fluid circulation direction.

The invention also relates to a fuel circuit of an aircraft turbine engine comprising at least one flow limiter according to the invention.

In all the figures, similar elements bear identical reference symbols.

PRESENTATION OF THE FIGURES

Other characteristics, goals and advantages of the invention will be revealed by the description that follows, which is purely illustrative and not limiting, and which must be read with reference to the appended drawings wherein.

In all the figures, similar elements bear identical reference symbols.

DETAILED DESCRIPTION OF THE INVENTION

Figure 1:
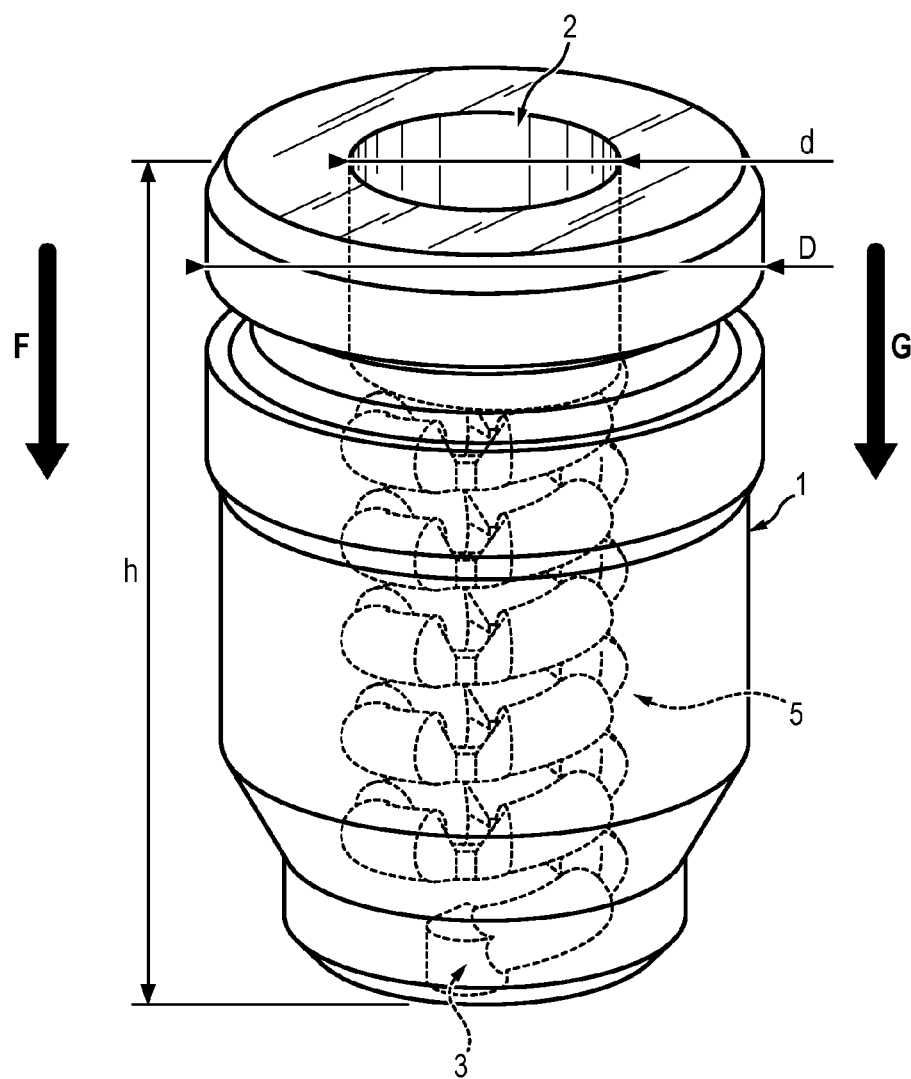
FIG. 1 illustrates an overview of a flow limiter according to a first embodiment.
Figure 2:
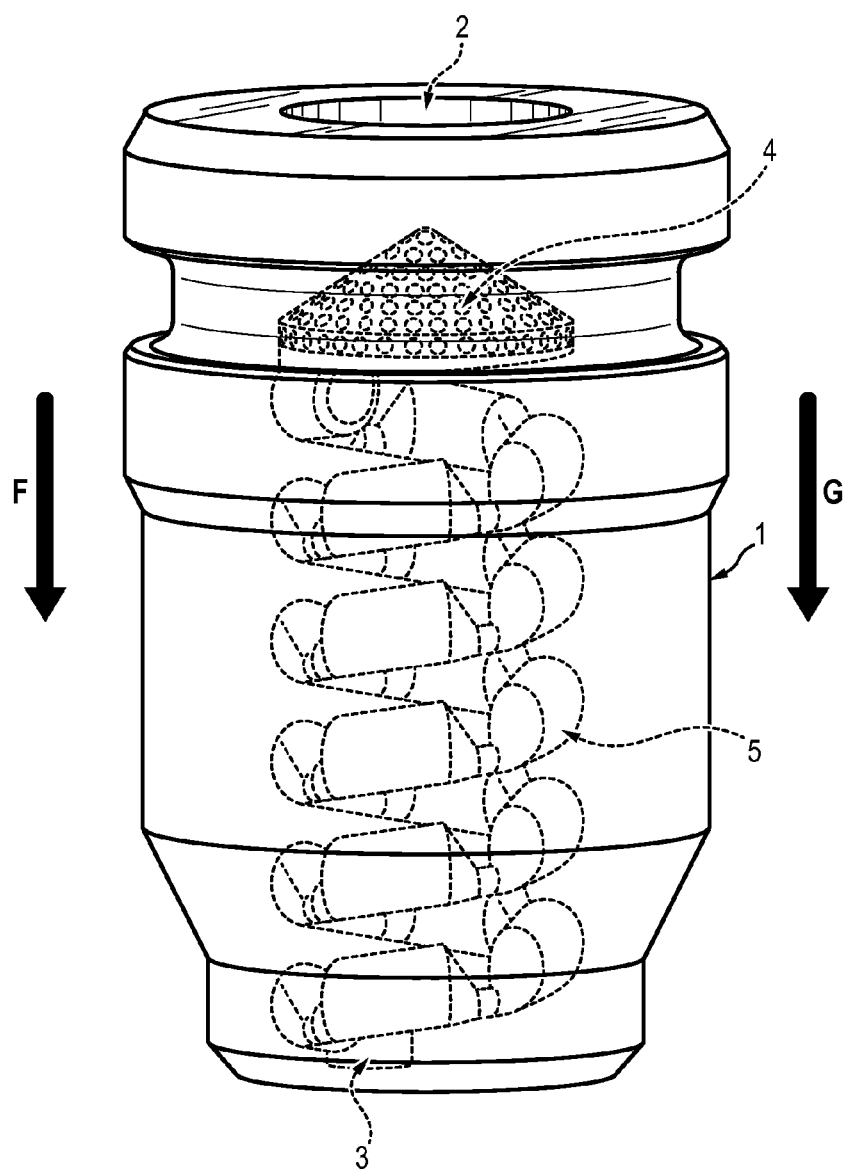
FIG. 2 illustrates an overview of a flow limiter according to a second embodiment.

FIGS. 1 and 2 illustrate a flow limiter comprising a body 1 comprising a fluid intake 2 and a fluid outlet 3.

A fluid entering into the limiter circulates from the intake 2 toward the outlet 3 (arrow F in FIGS. 1 and 2).

The body 1 has a generally cylindrical or frustoconical shape with an outside surface which is not necessarily regular.

The intake 2 consists of a cylinder arranged in the body 1 which is in fluid connection with a pipe 5.

Figure 3:
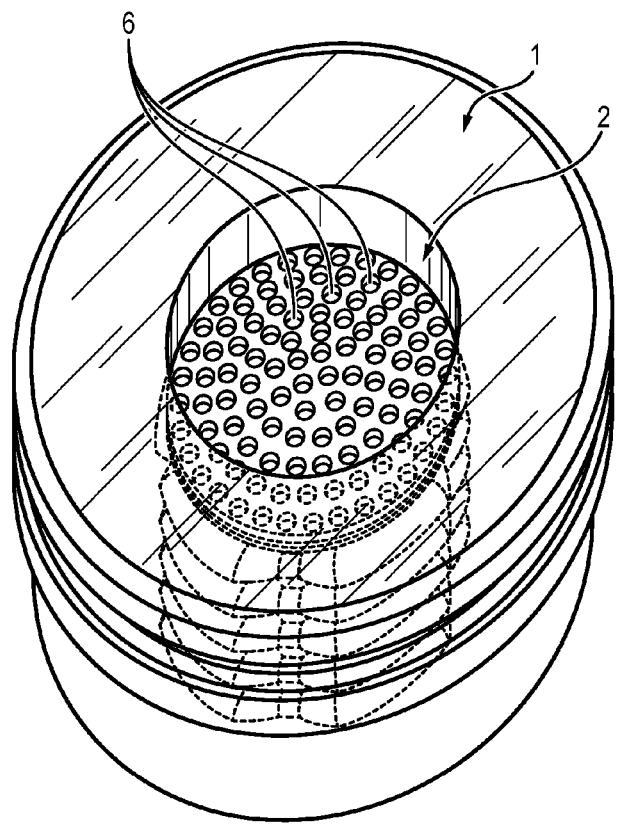
FIG. 3 illustrates a view of the intake of the flow limiter.

Advantageously, a strainer 4 is positioned directly downstream of the intake 2 of the limiter in the fluid circulation direction (see FIG. 3). This is a grid arranged at the intake 2, the strainer 4 being in fluid connection with the pipe 5.

The strainer 4 allows the entering fluid to be filtered to avoid having impurities penetrate into the pipe 5 situated downstream of the strainer 4.

Alternatively, or as a supplement, the strainer 4 can be positioned at the outlet 3 of the limiter (not shown).

The strainer 4 is preferably in the form of a cone comprising several holes 6, preferably of identical size. Other shapes are conceivable however.

In addition, according to one embodiment (not shown) it is possible to provide a strainer at the intake of the limiter and a strainer at the outlet of the limiter.

It will be noted, however, that the presence of the strainer 4 is not compulsory.

Figure 4:
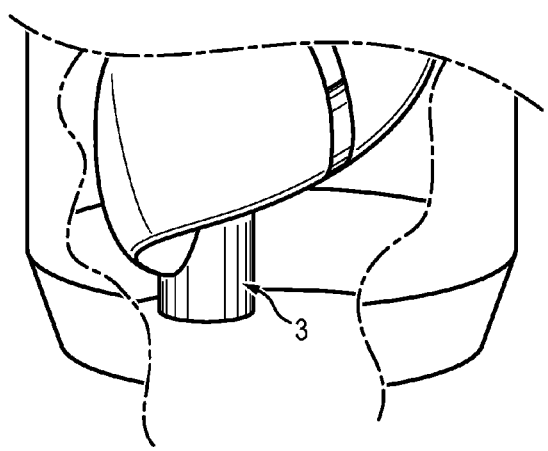
FIG. 4 illustrates a view of the outlet of the flow limiter.

The pipe 5 is arranged in the body 1 between the intake 2 and the outlet 3 (see FIGS. 1 and 2 and FIG. 4), and has a generally tubular shape and has a bottom having a regular curve so that the pipe 5 does not have area(s) retaining the fluid in circulation in the pipe 5.

Figure 5:
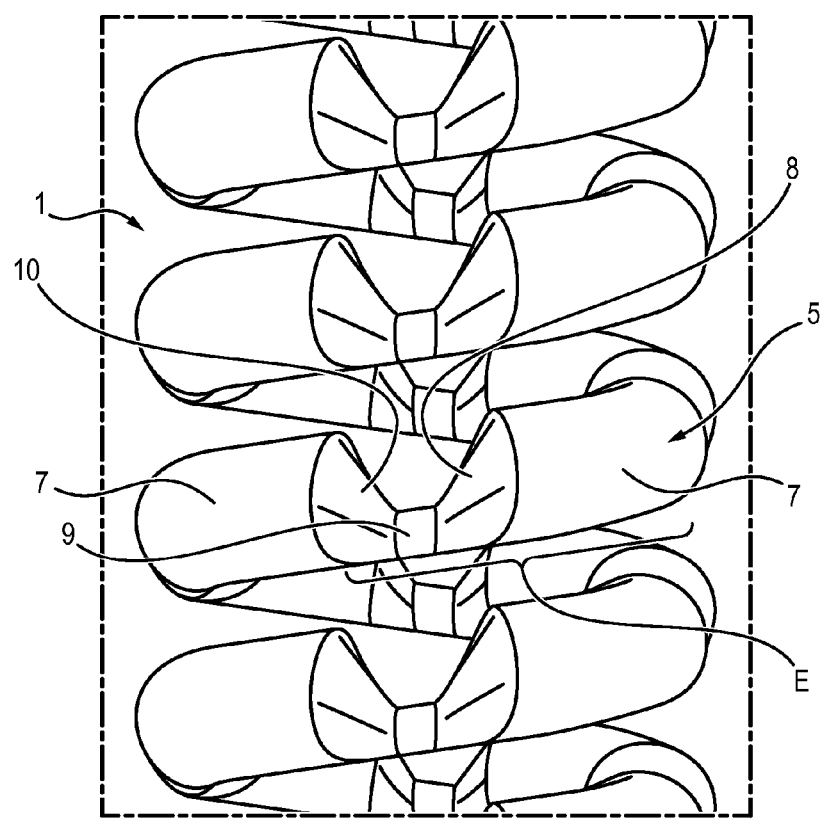
FIG. 5 illustrates a view of the pipe of the flow limiter.

The pipe 5 comprises a succession of chambers 7, 8, 9, 10 with different cross sections (see FIG. 5).

In particular, there is a succession of sprinklers 9 positioned between the main chambers 7 with a larger cross-section, the sprinklers 9 being connected with the main chambers 7 through secondary chambers 8, 10 of frustoconical shape, with a convergent shape for that upstream of the sprinkler 9, in the fluid circulation direction, and with a divergent form for that downstream of the sprinkler 9, in the fluid circulation direction.

The succession of sprinkles makes it possible to provide a component equivalent to a single sprinkler with a small flow area, while reducing the risk of blockage (pollutant particle which can block a small sprinkler but passes freely through larger flow areas) and reduces sensitivity to aeration/cavitation of the fluid passing through it. The pipe 5 is preferably in the shape of a circular helix (see FIG. 5).

The helical shape of the pipe makes it possible to have more sprinklers than if it were straight, within a given usable space. The radius of the helix depends on the size of the body 1 and on the cross-section of the chambers of the pipe 5.

The pipe 5 therefore has a slope which allows the circulation of the fluid in the limiter. In addition, the limiter is oriented so that gravity (arrow G in FIGS. 1 and 2) guarantees the absence of a lower dead point, that is areas of the pipe which could lead to retention of the fluid in circulation in the pipe.

In particular, the pipe 5 is a succession of assemblies E each comprising: a cylindrical main chamber 7 having a first cross-section, followed by a secondary chamber 8 and a cylindrical sprinkler 9 having a second cross-section, followed by a second secondary chamber 10. The first secondary chamber and the second secondary chamber have a frustoconical shape. As previously described, the first secondary chamber has a frustoconical shape, with a convergent shape for that upstream of the sprinkler 9 in the fluid circulation direction, and with a divergent shape for that downstream of the sprinkler 9 in the fluid circulation direction.

In addition the main chamber, the first and the second secondary chamber and the sprinkler share a common generator, so that the bottom of the pipe is a regular helical curve.

The sprinklers 9, as is clearly illustrated in FIG. 5, are located in the lower portion. In addition, between the different chambers there is always a regular sloe without changes or breaks thereof. Thus, the bottom of the pipe 5 is always continuous.

In this manner, at the sprinklers 9 there is no retention area which can cause a coking phenomenon in the pipe 5.

Again in relation with FIG. 1, the flow limiter has an external diameter of the pipe D comprised between 10 and 20 mm, an internal diameter d comprised between 5 and 10 mm and a height h comprised between 15 and 30 mm.

The limiter above is preferably obtained by manufacturing means using material addition, additive manufacturing, of the selective laser powder-melting type.

The powder is preferably metallic, typically Hastelloy X, based on nickel or aluminum, type AS7G06. The powder can also be composed of plastic.

The Laser, which is a high-energy beam capable of locally melting the powder for the purpose of building a part layer by layer.

Figure 6:
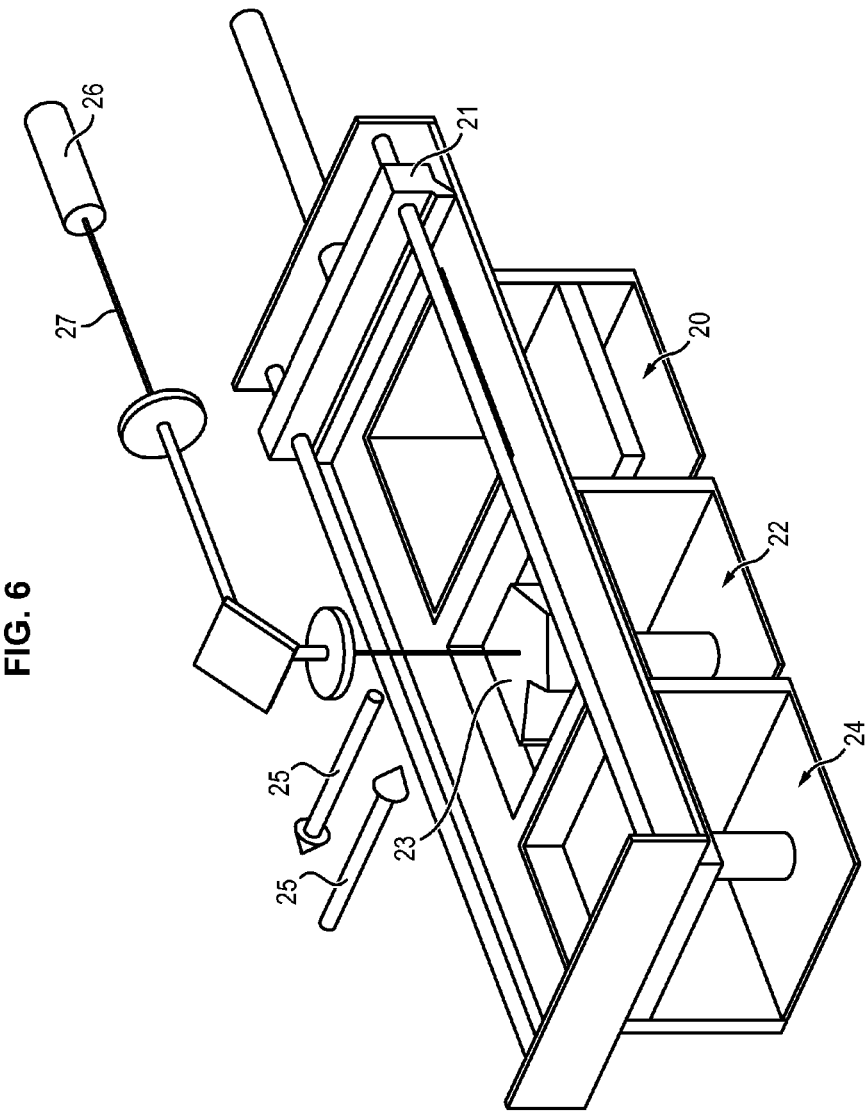
FIG. 6 illustrates an overview of a device for manufacturing a flow limiter.

FIG. 6 illustrates a material-adding manufacturing device of the selective laser powder-melting type.

The device comprises a powder feed reservoir 20 which is movable, a system 21 for spreading the powder bed brings the powder to a movable construction platform 22 which rises progressively as the part 23 (the limiter) is manufactured. A powder recovery reservoir 24 is used to recover the powder that is not used.

Manufacturing occurs in a controlled atmosphere to allow laser melting. To accomplish this, the manufacturing device comprises an atmosphere control system 25.

In addition, the manufacturing device comprises a laser source 26 and an optical system 27 which makes it possible to direct the laser beam to the construction platform 22.

Within the scope of this method (see FIG. 6), the part 23 is manufactured by a succession of layers of tens of microns. An energy source 26, of the laser type, selectively melts the layers of powder one by one according to the 3D design model.

This method allows parts to be manufactured that cannot be created by removing material.

Thanks to this method, the various elements constituting the limiter do not consist of a complex assembly which could be improved in any case and could cause inaccuracies in assembly and consequently create slope breaks in the pipe in particular.

Additive manufacturing makes it possible to generate the limiter progressively by growing the structure of the limiter.

Thus, all machining problems of the different parts necessary for the structure of the limiter are resolved.

The invention claimed is:

1. A flow limiter comprising a body comprising a fluid intake and a fluid outlet: wherein said body is arranged a fluid circulation pipe comprising a succession of chambers of different cross-sections connected with the fluid intake at a first end and with the fluid outlet at a second end, the pipe having a generally tubular shape, the pipe having a curved bottom so that the pipe does not have any area(s) retaining the fluid circulating in the pipe, the pipe being a succession of assemblies each comprising: a main cylindrical chamber having a first cross-section followed by a first secondary chamber and a cylindrical sprinkler having a second cross-section followed by a second secondary chamber, the main chamber, the sprinkler, the first and second secondary chambers share a common generatrix so that the curved bottom of the pipe is a helical curve.

2. The flow limiter according to claim 1, wherein the first secondary chamber has a frustoconical shape and is convergent in the fluid circulation direction, the second secondary chamber has a frustoconical shape and is divergent in the fluid circulation direction.

3. The flow limiter according to claim 1, comprising a strainer connected with the fluid intake arranged downstream of the fluid intake in the fluid circulation direction.

4. The flow limiter according to claim 1, comprising a strainer connected with the fluid outlet arranged upstream of the fluid outlet in the fluid circulation direction.

5. A manufacturing method for a flow limiter according claim 1, characterized in that said flow limiter is manufactured by additive manufacturing.

6. The manufacturing method according to claim 5, wherein the additive manufacturing is of the laser powder-melting type.

7. The manufacturing method according to claim 6, wherein the powder is preferably metallic, typically Hastelloy X, based on nickel or aluminum, type AS7G06.

8. Fuel circuit of an aircraft turbine engine comprising at least one flow limiter according to claim 1.

* * * * *